United States Patent [19]

Mohlenbrock et al.

[11] Patent Number: 4,667,292
[45] Date of Patent: May 19, 1987

[54] MEDICAL REIMBURSEMENT COMPUTER SYSTEM

[75] Inventors: William C. Mohlenbrock, Rancho Santa Fe; Peter J. Farley, Orinda; Donald E. Trummell, Jr., Union City; Theodore E. Kahn, Oakland, all of Calif.

[73] Assignee: Iameter Incorporated, San Mateo, Calif.

[21] Appl. No.: 580,799

[22] Filed: Feb. 16, 1984

[51] Int. Cl.⁴ .................. G07G 7/48; G07G 15/20; G06F 15/42; G06F 1/00
[52] U.S. Cl. ............................. 364/406; 364/200; 364/413; 364/436
[58] Field of Search ............... 364/401, 406, 407, 408, 364/413, 415, 464, 200, 900, 513; 128/904; 179/84 VF

[56] References Cited

U.S. PATENT DOCUMENTS

| | | |
|---|---|---|
| 4,290,114 | 9/1981 | Sinay .................... 364/900 |
| 4,315,309 | 2/1982 | Coli ..................... 364/200 |
| 4,360,875 | 11/1982 | Behnke .................. 364/436 |
| 4,435,769 | 3/1984 | Nagano et al. ............ 364/406 X |
| 4,491,725 | 1/1985 | Pritchard ................ 364/413 X |
| 4,553,206 | 11/1985 | Smutek et al. ........... 364/300 |

Primary Examiner—Jerry Smith
Assistant Examiner—Jon D. Grossman
Attorney, Agent, or Firm—Majestic, Gallagher, Parsons & Siebert

[57] ABSTRACT

A computer system for identifying the most appropriate of the billing categories (Diagnosis Related Groups) prescribed by the a governmental entity as a basis for determining the amount that health care providers, such as hospitals, are to be reimbursed under Medicare and similar programs for services provided to patients. The computer system responds to an initial determination of a category, upon admission of a patient, to list for medical personnel involved in giving care to the patient, such as the attending physician, a few other medically related categories for consideration as diagnosis and treatment proceeds. Only those related categories that can apply to a particular patient are listed for that patient, thereby reducing the time necessary for the physician to review and designate any new category that may be more accurate than the first. When a new category is designated by the attending physician, a new listing is provided the physician with those categories medically related to the newly designated category being listed. A brief review by the physician each day, with a new listing provided by the computer system for the following day's review if the physician designates any change, gives an accurate determination of the most appropriate billing category by the time services to the patient have been completed, such as when a patient leaves a hospital. A billing category determined in a conventional manner by medical records clerical personnel after medical services are ended can then be compared and reconciled with the physician determined category in order to improve the accuracy of the conventional determination.

10 Claims, 5 Drawing Figures

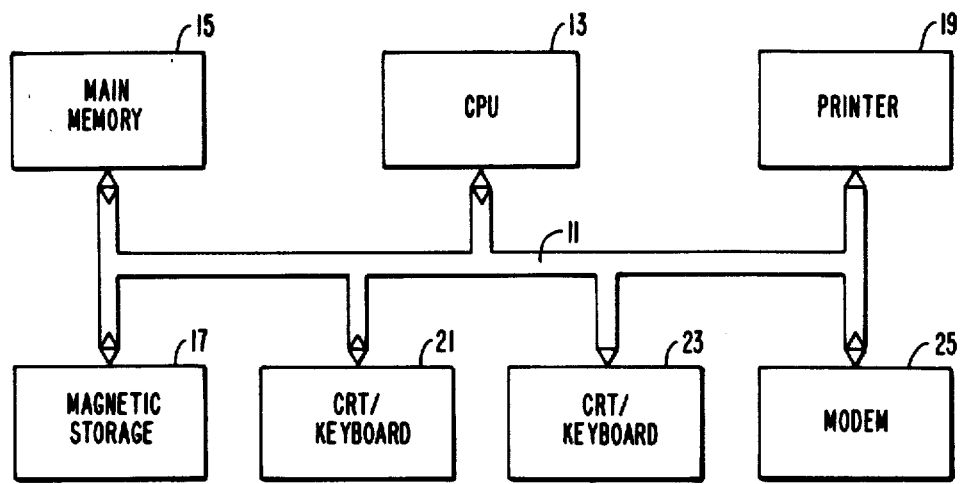
FIG._1.
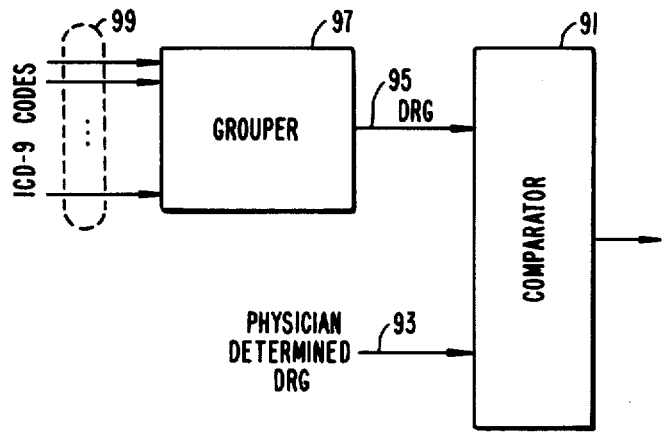
FIG._5.

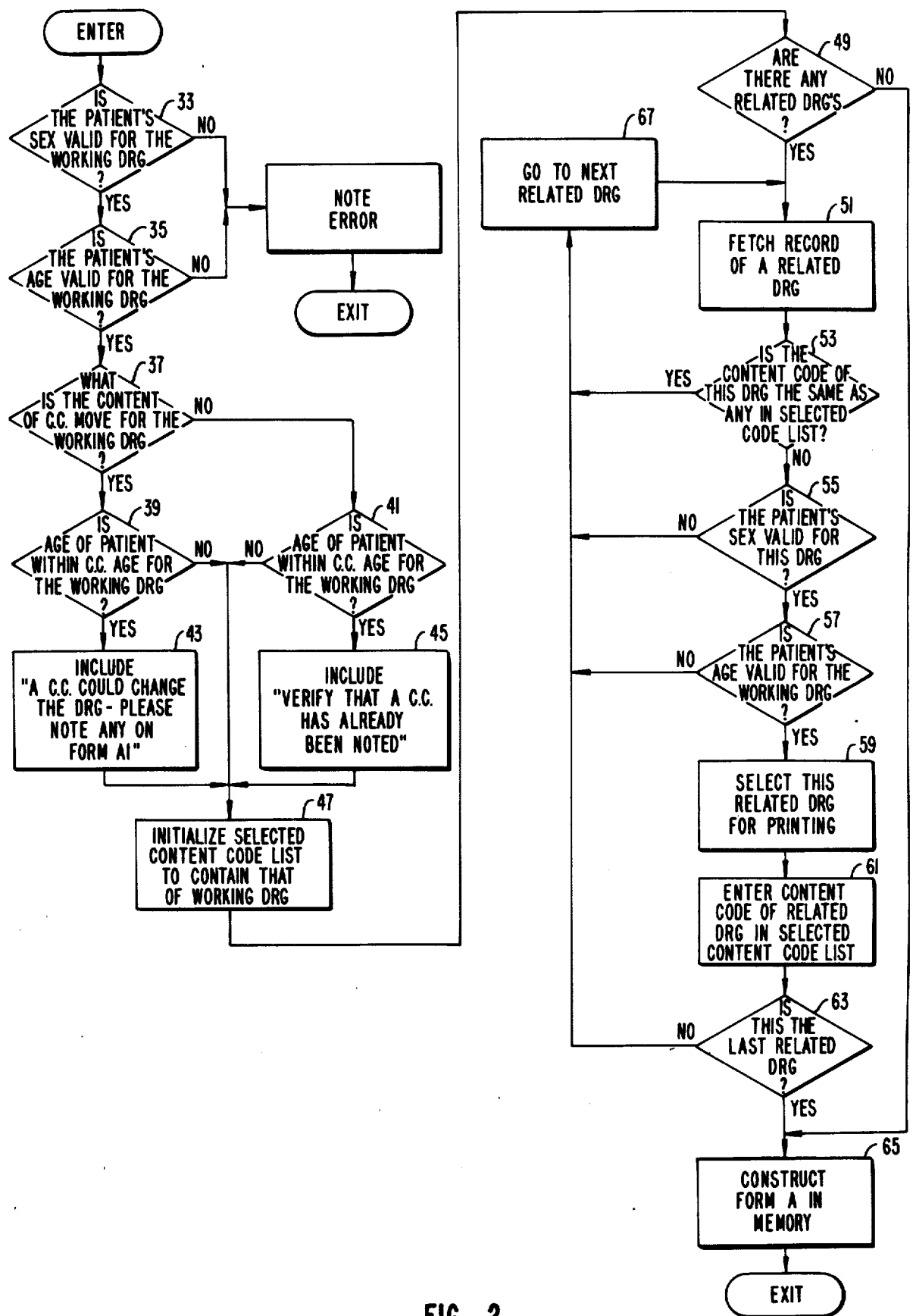
FIG._2.

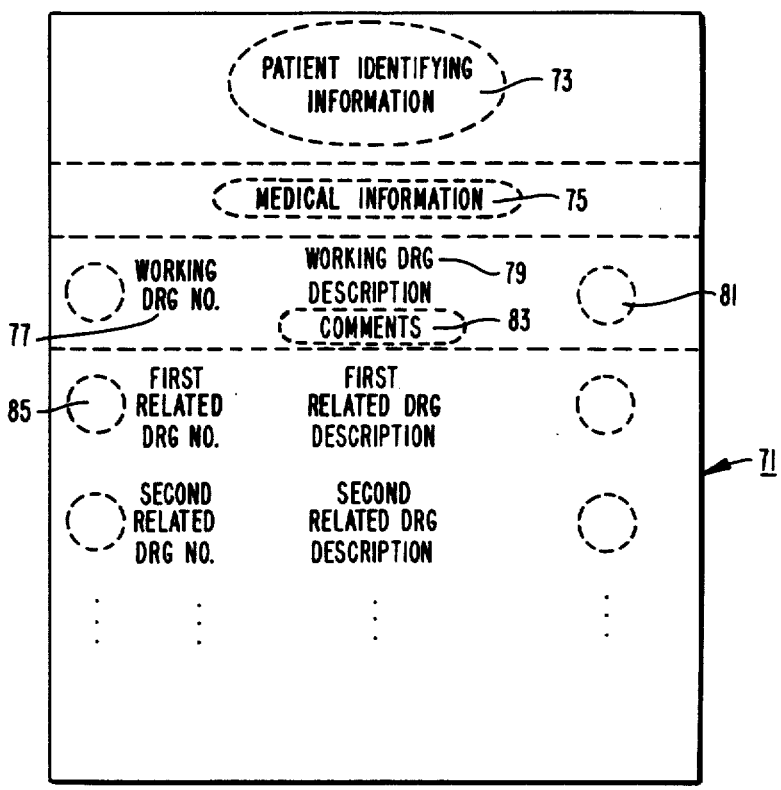
FIG._3.
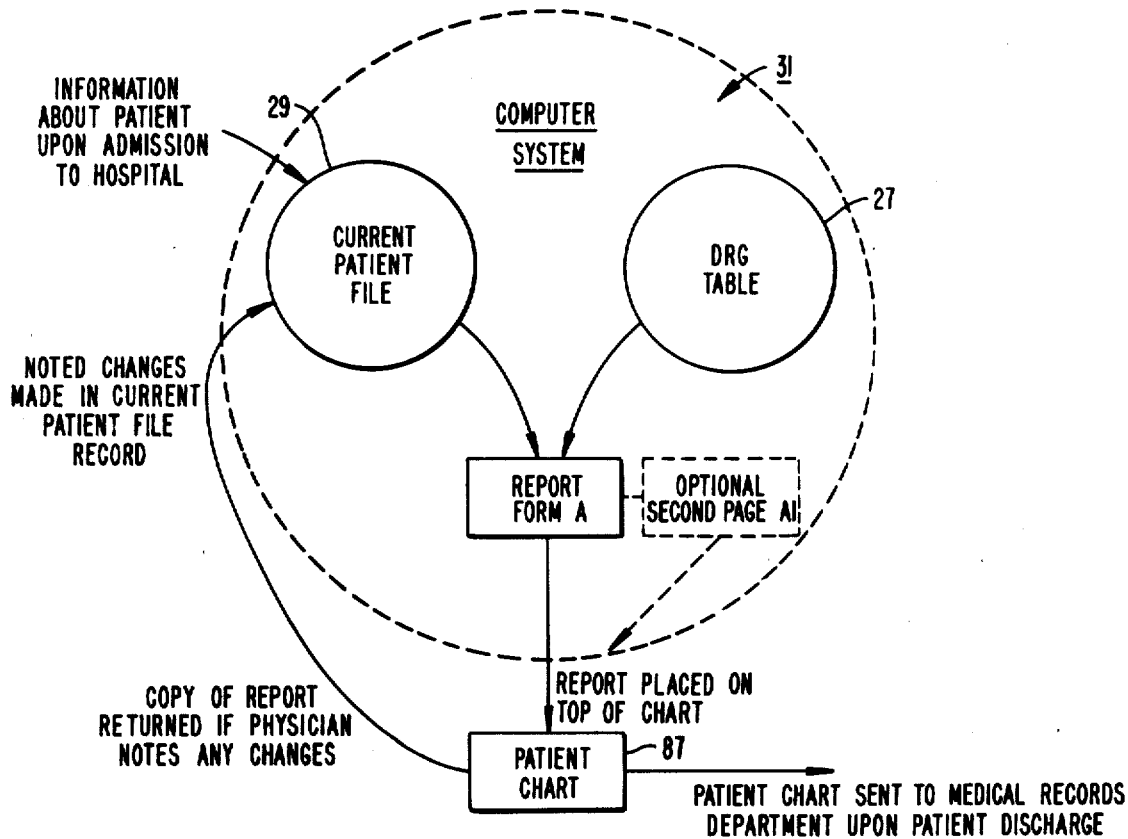
FIG._4.

MEDICAL REIMBURSEMENT COMPUTER SYSTEM

BACKGROUND OF THE INVENTION

This invention relates generally to a technique and system for providing payments to health care providers.

Due to the geometric escalation of medical care costs, there is increased pressure on public policy makers to establish cost containment programs. For this reason state and Federal governments are beginning to adopt various case specific or case-mix reimbursement systems. The Social Security Amendments of 1983, (Public Law 98-21), specifically require a diagnosis specific prospective payment system to be incorporated into Medicare reimbursement policies.

The Federal government has therefore adopted a new payment plan for reimbursing hospitals for Medicare patient costs. Hospitals will be reimbursed according to a fixed schedule for each patient without regard to actual costs to the hospital in rendering medical services to the patient. The law provides for a 3-year transition period during which a decreasing portion of the total prospective payment will be based on hospitals' historical costs in a set base year and a gradually increasing portion will be based on a regional and/or national Federal rate per patient discharge. Beginning with the fourth year and continuing thereafter (i.e. cost reporting periods beginning on or after Oct. 1, 1986), Medicare payment for hospital inpatient services will be determined completely under a national DRG (Diagnosis Related Group) payment methodology. It is expected that this same reimbursement policy will in time be extended to establish the level of reimbursement to other health care providers and/or from other government entities and insurers.

The DRGs represent a clinical statistical classification effort to group together those diagnoses and procedures which are clinically related and have similar resource consumption. The DRGs are defined by a particular set of patient attributes which include a principal illness diagnosis, specific secondary diagnoses, procedures performed, age, sex and discharge status (i.e., how the patient left the hospital, whether the patient was transferred, died, etc.). A fixed reimbursement factor (relative weight) is assigned to each DRG by the government. This determines the amount the hospital will be reimbursed for treatment of a patient that falls within the DRG, regardless of the hospital's cost or what the charges would have been for a non-Medicare patient. The treatment of a patient during a single hospital stay is classified in only one DRG.

There are currently 467 DRGs which cover all patients treated under inpatient conditions. These are set forth in the regulations of the Health Care Financing Administration (See the Federal Register, Vol. 48, No. 171, Sept. 1, 1983, pages 39752-39886, for an Interim Final Rule that includes a listing of the DRGs and the reimbursement procedures involving their use. See also the Federal Register, Vol. 49, No. 1, Jan. 3, 1984, pages 234-334, for the Final Rule). Table I attached hereto gives the published information from these Federal regulations for a few DRGs as examples.

In addition to the 467 DRGs, there are three additional patient groups referred to as groups 468 through 470. DRG 468 includes patients for whom all surgical procedures were unrelated to their principal diagnosis. Group 469 includes cases where the principal diagnosis, while valid medically, is not accepted for DRG purposes as a principal diagnosis. Group 470 includes cases which could not be assigned to the other valid DRGs because of coding errors in that particular patient's medical records. DRG's 469 and 470 are not valid for payment. The more complex diagnoses that typically consume more resources should result in a more complex set of diagnoses and procedures and thus result in a higher paying DRG. (See the different relative weights in the example DRG's of Table I.)

Under the current version of this reimbursement system, the hospital does not directly determine the appropriate DRG category for services rendered a Medicare patient. Rather, the hospital submits an appropriate Federal form which includes codes from the ICD-9-CM coding system to identify the diagnoses made and procedures performed, and gives patient information that is relevant to determining the appropriate DRG category, such as age and sex. From this information, an intermediary reimbursing agent, or the Health Care Finance Administration itself, determines the proper DRG.

The commonly used notation "ICD-9-CM" means the International Classification of Diseases—9th Revision, Clinical Modification, and refers to a coding system based on and compatible with the original international version of the ICD-9 coding system provided by the World Health Organization. The ICD-9-CM coding system is used in North America, and it is a classification of diseases, injuries, impairments, symptoms, medical procedures and causes of death. These codes are listed in detail in a publication of the Commission on Professional and Hospital Activities, Ann Arbor, Mich., entitled "ICD-9-CM", Jan. 1, 1979. A exemplary list of a few ICD-9 codes is given in Table III attached hereto.

The ICD-9-CM coding system was designed for the classification of morbidity and mortality information for statistical purposes and for the indexing of hospital records by disease and operations for data storage and retrieval. The ICD-9 codes are initially divided into Disease and Procedure sections. These sections are further divided into subsections which encompass anywhere from 1-999 three digit disease or 1-99 two digit procedure code categories. Within the three digit code categories there can be an additional 1 or 2 decimal digits to divide the codes into subcategories which further define the disease manifestations and/or diagnostic procedures. There are approximately 15,000 ICD-9, codes. Only a fraction of these are relevant for determining Medicare payments. The new Medicare payment system first involves the coding of diagnostic and procedural information into ICD-9 code numbers by hospital medical records clerks before a patient can be assigned a DRG.

Each DRG is determined in part by an ICD-9 code for the principal diagnosis, and ICD-9 codes for each procedure that may have been performed. There are also ICD-9 codes for complications ocurring during treatment or the existance of co-morbidities (i.e., secondary diagnoses of conditions existing at the time of admission). These, as well as the patient's age, sex, and discharge status, determine a particular DRG for the patient. It is possible that a large number of sets of ICD-9 numbers or codes can lead to the same DRG. Some DRGs also require an ICD-9 code for a secondary diagnosis.

As can be seen from the DRG definition excerpts in Table I hereto, a patient's age is frequently a part of the definition. Pediatric patients (age 17 or less) and elderly patients (age 70 years or more) often fall into separate DRG categories that otherwise have the same textual definition. Where this occurs, the hospital is paid more for treatment of the older patient by assigning a higher paying DRG.

Also, the presence of a complication or comorbidity (collectively denoted in the DRG definitions as "C.C.") with a patient is required for many DRGs. The patient with a complication or comorbidity is considered to be a sicker person for certain illneses than one without a C.C. and the hospital is reimbursed more for those illneses by classifying such a patient in a higher paying DRG. However, not all medically recognized complications or comorbidities are recognized by the DRG reimbusement system to have any effect on the payment to be made. This and the entire DRG reimbursement system is decribed in the Federal Register referenced above.

Since the DRG method reimburses only specific amounts regardless of the actual costs, and since a large, significant proportion (some hospitals are 40% and higher) of the patients in most hospitals are Medicare patients, it is extremely important that the ICD-9 codes submitted for reimbursement be complete and accurate enough to assure that the highest correct paying DRG is assigned for each patient. The actual reimbursement that a hospital receives for each patient involves the multiplication of the relative weight of the DRG (see Table I) with other factors set by the government. These other factors are determined by statistical variables (e.g. the cost data of that particular hospital for the 12-month period ending on or after September, 1982 and before September, 1983, the type of patients a hospital treats in relation to the hospital's resources expended for those patients, and the wage and cost of living index). It is also important that the hospital is cost effective in handling this data as well as in caring for its Medicare patients. A hospital which is not cost effective will suffer severe financial difficulties. A cost effective hospital, however, may actually profit from this plan.

One technique for increasing the likelihood of accuracy and cost effectiveness in working with the new Medicare DRGs is to incorporate it into a computer system. A variety of computerized purely medical data handling systems exist, extending from a computer assisted system for taking patient medical histories as disclosed in U.S. Pat. No. 4,130,881 to a patient report generating system for reporting medical test data for an entire patient population. This system as disclosed in U.S. Pat. No. 4,315,309 organizes cumulative medical test data into data packages which include only the results of tests making up a particular organ system disease related subset of tests.

Two computerized systems also exist which relate directly to the Medicare DRG plan. The first of these is the DRG Grouper System which converts a single ICD-9 code or a set of ICD-9 codes and the other DRG related factors (age, co-morbidity, etc.) for a patient into the corresponding DRG category. This is public information that is available at cost. One company manufacturing an enhanced DRG Grouper is the DRG Support Group, Ltd., a subsidiary of Health Systems International, Inc. The second DRG related computerized system is provided by Code 3 Corporation. The Code 3 products are computer programs which use a medical encyclopedia as part of its database and calculates the DRG at the time the coding or abstracting is being done. Key words taken from a doctor's diagnoses are first entered into the computer. The computer then responds by offering other diagnostic conditions which have bearing on a DRG classification. Depending on the selection of other diagnostic conditions, the computer assigns an appropriate DRG. The Code 3 products can also store the DRG in the patient's abstract by utilizing a computerized abstractor.

These systems, however, still depend upon the ability of hospital medical records personnel who are not trained in clinical medicine but who are routinely responsible for preparing ICD-9 codes for reimbursement reports after the patient has been discharged from the hospital. The clerk necessarily has to search the usually thick patient chart in order to find conditions and procedures in order to identify the correct ICD-9, codes. This usually requires having to interpret various handwriting styles and different forms of notation that exist among physicians. Even more subjective is the necessity of medical records personnel to try to interpret clinical patient data to arrive at diagnostic data that can be coded for purposes of reimbursement. The physician may even fail to note information that is important for the purpose of reimbursement to the hospital because the physician does not consider it to have sufficient medical importance that would affect care of patients. Yet the obtaining of this information from the patient chart can be very important to the hospital since overlooked specific diagnostic and/or procedure information which was performed can cause assignment of a lesser value DRG. The result can lose the hospital money to which it is entitled. It has even been shown by studies conducted by the Institute of Medicine in 1974 and 1977 that such a method of coding diagnoses and procedures has a high rate of error because of these and other factors.

Therefore, it is a primary object of this invention to provide a computer system to assist any of the medical personnel involved in either the care of patients or quality assurance of such medical care, to determine reimbursement codes and categories that minimizes such errors, and thus to improve the accuracy and reliability of the information reported.

It is a further object of this invention to provide a computer system that minimizes the number of missed diagnoses or procedures that can increase the amount of reimbursement to the health care provider.

It is yet another object of this invention to provide a computer system that results in more accurate information from which cost and profit figures can be obtained for management purposes.

SUMMARY OF THE INVENTION

These and additional objects are accomplished by the present invention wherein, briefly and generally, a computer system is provided that assists in the determination of the most appropriate DRG by interaction with someone who is involved with giving care to patients at the time of providing such care, rather than by someone who is not trained in clinical medicine at a time after the patient's care has been completed. The attending physician, who knows the most about a patient, is the best person to do this. But the role of the physician in making this determination takes very little additional time or effort from that now required for the physician to make notations on the patient's hospital chart. The computer system provides the physician with a short list of medically related DRG's from which to choose, thereby also promoting uniformity in reporting among physicians. This list is further limited by a combination of the characteristics of the patient and an initial principal diagnosis in order to tailor it to the specific situation. Extraneous information not relevant to reimbursement for a particular patient is left off the report form for that patient. The physician thereby has the relevant choices limited from all the 467 DRG categories to only a few relevant ones. Once a new DRG choice is made, the computer system provides a new list of related DRG's from which the physician can choose during the next cycle of review, should one of them be considered more accurate upon further reflection or it is found from further treating and tests of the patient that another DRG is more appropriate. The attending physician is thus guided to identify matters that are important to reimbursement which he or she may otherwise not communicate because of an unfamiliarity with the reimbursement process or the cost implications of a condition which is documented in a different or more specific fashion. Involving the physician with ICD-9 codes is not desirable because he or she is not knowlegable of the very large number of categories, this number being considerably reduced by the DRG system. At the time the patient is discharged, therefore, a working DRG has been determined by the attending physician.

This determination is useful by itself and is also an aid to the medical records clerk who must proceed after the patient has been discharged to code ICD-9 diagnosis and procedure numbers from the information existing in the patient's hospital chart, in accordance with current procedure. The manually determined ICD-9 numbers can be applied to an available grouper computer program in order to see what DRG will result by the method the government reimbursement agency will utilize. This DRG number can be compared by the computer system, or by the medical records clerk, to the working DRG determined earlier. If they agree, a high degree of confidence exists in the DRG and in the manually coded ICD-9 numbers. If they disagree, it is known that a reconciliation must be made, leading to a higher degree of reliability in the reported numbers. This assists the hospital to obtain the maximum reimbursement to which it is entitled.

Additional objects, features and advantages of the various aspects of the present invention will become apparent from the following description of its preferred embodiment, which description should be read in conjunction with the accompanying drawings.

BRIEF DESCRIPTION OF THE DRAWINGS

FIG. 1 shows a block diagram of a typical computer system that may be utilized to practice the present invention;

FIG. 2 is a flow diagram of a computer program which operates with the computer system of FIG. 1 in carrying out the various aspects of the present invention;

FIG. 3 shows a sample of information resulting from operating the computer system and program of FIGS. 1 and 2;

FIG. 4 is a system flow diagram which shows the role played by the computer system and program of FIGS. 1 and 2; and FIG. 5 illustrates the integration of the system of FIGS. 1 and 2 and an existing system.

DESCRIPTION OF A PREFERRED EMBODIMENT

Referring initially to FIG. 1, the main components of a computer system that is suitable for implementing the various aspects of the present invention will be described. Connected to a common computer bus 11, are several operational units that form the computer system. These are a central processing unit (CPU) 13, a main R.A.M. memory 15, a disc drive 17, a printer 19, and an entry keyboard and CRT terminal 21. A second such terminal 23, and perhaps even additional terminals, can be provided as desired. A modem 25 is optionally provided to add a communication capability.

A principal magnetic disc data file that is part of the system of FIG. 1 is that containing information of all the DRGs. It is accessible by the disc drive 17. The DRG file is a static computer database having one record for each DRG number. The information included in each such record is given in Tables I and II attached hereto, which shows stored information for eight DRGs as examples. Table I shows six fields of information for each of the example DRGs given. This information is that published as part of the Federal regulations. The first stored item of information is the DRG number, some unique number between 1 and 470. The next item of information, shown in the second column of Table I, is the Major Diagnostic Category (MDC) in which the individual DRG falls. The 467 specific DRGs are grouped by the Federal regulations into 23 MDCs of related DRGs.

The third item of information for each DRG maintained in the static DRG database is shown in the third column of Table I, namely the title or textual description of the DRG. What is shown in Table I are all of the items published in the Federal Register. It will be noticed that the textual descriptions are very brief, so it may be desirable to expand that description into medically relevant terminology for the purpose of the DRG database herein. The age range and reference to a C.C. (complication or co-morbidity) can also be omitted from the DRG record file since, as described below, these items are included in other derived data fields.

The fourth data field, shown in the fourth column of Table I, is a relative weight for each DRG. As discussed above, this determines the amount of compensation that is given a hospital for treating a patient whose diagnosis and/or procedures cause a particular DRG to be designated. The relative weight is not used in the computer system to be described, and can optionally be omitted, except that it is desirably shown in a listing or printout whenever its DRG is given.

The same is true for each of the last two items of Table I. The column "Mean LOS" is a calculated average length of stay for a patient within the DRG. The "Outlier Cutoffs" column carries information of a maximum length of stay in days that should be allowed. These last two items of information are desirably printed whenever information as to its DRG is printed in order to provide hospital staff with these guides, but they are not otherwise used in the computer system to be described.

From the information given in the Federal Regulations, a sample of which is shown in Table I, certain other information as shown in Table II attached hereto is derived and stored in additional fields of the static DRG database. One such item of information is the "Age Range" shown in one column of Table II for the same DRGs whose public information is shown in Table I. This quantity is simply the range of ages of patients that could be classified into the DRG. The DRG system assumes that a patient will not exceed 124 years of age, so that is the maximum age utilized. For DRGs 16 and 17, the definition in Table I says nothing of age, so the maximum age range of 0–124 years is utilized. For DRG 34, an age is specified in excess of 69 years, but yet the full age range of 0–124 is utilized since a younger patient could be categorized in DRG 34 if a C.C. exists. DRG 35, however, is definitely limited in age, so the designated age range is 0–69 years. DRG 98, it will be noted, is limited to patients from 0–17 years, and so that is the range that exists in the Age Range field of that DRG record.

It will be noted from the titles of the DRGs in Table I that DRGs 16 and 17 have the same titles except for the reference as to whether the existence of a C.C. is required or not in order to be within the DRG. A patient with the vascular disorders specified in the title description will be classified in DRG 16 or 17, depending upon whether the patient also has a complication or comorbidity (C.C.) or not, respectively. For this particular example, the relative payment weight given each of the DRGs 16 and 17 is the same, but usually there is a difference, so proper classification is important to the hospital. DRGs 16 and 17 are referred to as a "doublet". DRGs 34 and 35, as shown in Table I, are also a doublet, a patient being classified in one or the other depending upon age and/or the existence of a C.C.

DRGs 96, 97 and 98 are a "triplet" since they all deal with bronchitis and asthma, the particular DRG depending upon age and/or C.C. status. DRG 261 is given as an example of a single DRG that is applicable to a particular diagnosis and/or procedure. The patients age or C.C. status is not important for classification when such a DRG is the appropriate one.

In order to form a grouping of the doublets and triplets, a "Content Code" is assigned to each DRG. Such a Content Code is shown in a column of Table II and is a field of each DRG record stored in memory. Doublets and triplets have the same Content Code. DRGs 16 and 17, for example, are given the same Content Code since they are a doublet, this Content Code being different from any other Content Code. As a further example, DRGs 96, 97 and 98 are all assigned the same unique Content Code. The Content Code is utilized in the computer system, as described below.

Another field of information derived from the definitions of Table I is the permitted sex of a patient in order to be classified in that DRG. Most of the DRGs apply to both males and females, so the symbol "B" is shown in that column of Table II. Any DRG that applies only to females, however, would carry the notation "F", and any that apply only to males, the notation "M".

The column of Table II "C.C. Move" shows another field of the DRG record that is utilized by the computer system. Whether a "Yes" or "No" answer is stored in that field for a particular DRG depends on the answer to the following question for the DRG: If a patient currently classified in this DRG had a C.C. status, could the patient be reclassified into another DRG? This relates primarily to the DRGs grouped as doublets and triplets, as discussed above. The answer for a single DRG, such as number 261 illustrated in Tables I and II, will be "No" since there is no other DRG to which a patient would be reclassified if a C.C. status were to be noted. Looking at the doublet of DRGs 16 and 17, it can be seen that the answer is "No" with respect to DRG 16 since a C.C. is already required for the patient to be classified in that DRG. The existence of a C.C. cannot cause the patient to be reclassified. In its related DRG 17, however, a patient is classified there because of the absence of a C.C. The answer to the question for that DRG, therefore, is "Yes" since the notation of a C.C. would move the classification of the patient from DRG 17 to DRG 16. The situation is the same for the doublet of DRGs 34 and 35, and for the triplet of DRGs 96, 97 and 98, the C.C. Move fields for those DRGs being given in Table II.

Another quantity derived for each DRG is the "C.C. Age" which is shown in a column by that title in Table II. An age range is put into this field for each DRG that is in answer to the following question: What is the patient age range for that DRG wherein the existence or non-existence of a C.C. makes a difference in determining whether a patient is to be classified into it? Referring to DRG numbers 16 and 17 on Tables I and II, for example, it is seen that the C.C. Age is equal to the full age range of the DRGs since age is not a factor in either one of them. The existence of a C.C. will make a difference with patients within the full age range of 0–124 years.

That is not the case, however, with DRG 34 wherein the C.C. Age range of 0–69 is only a portion of the age range field of 0–124. This is because only for patients 69 years or less will a C.C. make a difference. A patient over 69 years old will be placed in that category whether or not a C.C. exists. The same is true for DRG number 96. For the single DRG 261, the C.C. Age is noted as 125–125 to indicate that there is no operative age range in which the existence of a C.C. will make any kind of difference as to the classification.

The C.C. age of 0–17 with respect to DRG number 98 deserves some explanation. It may seem upon first impression that since a C.C. is not involved in the definition of DRG 98 that the existence of a C.C. should make no difference and thus should carry the same notation as the single DRG number 261. However, the DRG classification system operates such that a patient within the age range of 0–17 that has a C.C. status would be classified in DRG 96. Therefore, the existence or non-existence or a C.C. for patients within the age range of 0–17 does make a difference for DRG 98. In the case of a doublet or triplet assembly of DRGs, the program first tries to fit the patient into the lowest number DRG, such as number 96 in this example of a triplet, since the definition of number 96 is for all patients having a C.C. status regardless of age. Only if a patient 69 years old or less, and does not have a C.C. status, will the DRG categories 97 or 98 be considered, depending upon whether the patient is in one or the other of the mutually exclusive age ranges.

The last field of information stored in a DRG record includes the numbers of related DRGs, as shown in the last column of Table II. These are the numbers of DRGs that are closely enough related medically to the DRG in whose record they are recorded so that they are likely candidates as alternate selections. The number of related DRGs is minimized so that the attending physician is presented with only medically related data from which to make a choice. But as is explained below, not all of the related DRGs recorded in the database will be presented to the attending physician for the principal DRG since some will be eliminated by the computer system as not possibly applicable to a particular patient.

The DRG table database is a static one and the same for all hospitals. For the computer system to operate, certain information of the patient is also required, primarily his or her age and sex. This information can be entered directly when the computer system is being operated, or, preferably, is maintained in a dynamic current patient file database along with other information of the patient, such as name, date of admission, attending physician's name, billing and medical record numbers, and the like. These two databases are shown in FIG. 4. The DRG database 27 and patient database 29 are shown as part of computer system 31 within the dashed outline. The rest of FIG. 4 is described later in this discussion in order to show how the computer system receives and dispatches information.

Another item of information that is stored in the patient database for each patient is a single "Working DRG". This is intially entered upon admission to the hospital by the admitting physician or nurse. At that time, it is a tentative choice that is based upon such symptoms and diagnosis that are available at the time. A primary function of the computer system being described is to provide the tools necessary for the attending physician to reclassify the patient into another DRG if that is appropriate. As the attending physician selects a new DRG, that then becomes the new "Working DRG" in that patient's record of the patient information database 29. The "Working DRG" can change several times during the hospital stay of a patient as further diagnoses are made and procedures performed, and upon discharge will be the finally determined DRG that is desired. Of course, the initially determined DRG may not, in many instances, be changed at all if turns out to have been correct to begin with.

Attached as Appendix I hereto is a computer program source code for a module illustrated in flow diagram form in FIG. 2. Appendix I is expressed in the C computer programming language and contains extensive comments. It is adapted to work with the VMS operating system of Digital Equipment Corporation (DEC) on a VAX computer. The computer program of Appendix I contains material in which a claim of copyright is made by Iameter Incorporated, the assignee hereof. This assignee has no objection to the duplication of Appendix I hereto by photocopying and the like, but reserves all other copyright rights therein.

The system implemented by the computer operated with the program illustrated in FIG. 2 has a purpose of building a listing of related DRGs and other information for an attending physician. The resulting information may be listed and displayed in a number of ways, the most convenient being to print a hard copy form that is placed with the patient's chart for review by the attending physician. An example of such a report form is shown in FIG. 3.

After the computer system of FIG. 2 is initiated, the first operation performed is a decision indicated at 33 as to whether the patient's sex as existing in the current patient file database 29 (FIG. 4) is valid for the Working DRG also stored in that database. The computer compares the patient file sex with that of the record of the DRG database 27 for the Working DRG to see whether it is valid or not. If it is . not, the process ends and the matter is returned either to lhe operator or to another software module which operates in response. If the patient's sex does match that of the working DRG, then a next step 35 is to compare the patient's age in the database 29 with the Age Range of the Working DRG database field. If the patient's age does not fit within the range required to be in the DRG, then the process will stop or be transferred to another software module. If there is a positive comparison, then the process continues since it has been determined that a valid Working DRG has been designated for that patient.

A next step 37 causes the computer to look at the C.C. Move field of the working DRG record. If the existence of a C.C. status with this patient can cause a DRG change, the data in that field will be a "Yes" and the process proceeds to a step 39. However, if the noting of a C.C. status would not cause any DRG change, the data in that DRG record field is a "No", and the process proceeds to a step 41.

Steps 39 and 41 each make the same decision, although they are in different paths depending upon the decision made by the preceding step 37. In each, the age of the patient is compared with the C.C. Age range of the DRG file for the working DRG. If the age of the patient is determined to be within the C.C. Age range of the working DRG in step 39, the text "A C.C. COULD CHANGE THE DRG—PLEASE NOTE ANY ON FORM A1", or the like, is constructed for printing on the report form in step 43 to go to the attending physician. Form A1 is an itemization of summary groups of C.C.s in a convenient form for the attending physician to check one or more of a broad range of categories that may apply to this particular patient. If one or more categories is checked, this then tells the computer operator when the report forms are returned, that the working DRG should be changed within a doublet or triplet to one that is appropriate for the fact of the existance of that C.C.

If the age of the patient is determined in step 41 to be within the C.C. Age range of the working DRG, a different message is readied for printing on the form as indicated in step 45, namely "VERIFY THAT A C.C. HAS ALREADY BEEN NOTED", or the like. For if in this path, the computer system has already determined that the Working DRG is one where a C.C. status had to have previously been noted or else that DRG would not apply.

After the appropriate phrase has been noted for communication to the attending physician, preferably by printing on the report form that goes to the physician, one phase of the computer program is completed and another starts at step 47. Also, if the age comparison of the operative of steps 39 or 41 is negative, neither of the phrases of steps 43 or 45 are printed and the process proceeds directly around those steps to the step 47. The steps 37 through 45 provide the attending physician with only the information with respect to C.C.s that is appropriate under the circumstances, and even omits to provide for printing any information when it is not called for. This keeps the physician's time required to deal with the additional paperwork at a minimum for the new reimbursement system.

In the same spirit of eliminating the burden on an attending physician from reviewing and dealing with any information or messages which are not appropriate in the circumstances, the processing steps 47-65 of FIG. 2 examine the list of related DRGs that are in the DRG database record for the current Working DRG. Those related DRGs that cannot fit this patient because the sex or age do not match are eliminated. Also, any DRGs with the same Content Code as the working DRG are eliminated since only one DRG of a doublet or triplet can be relevant.

At the step 47, a small portion of the computer memory (called the "Select Content Code List") is initialized to include the Content Code of the Working DRG. The subsequent step 49 asks whether there are any Related DRGs in the database in the record of the working DRG. If there are, as there are in all of those shown in Table II attached hereto, the process proceeds to step 51. If not, the next several steps are omitted.

In step 51, the complete record of the first Related DRG whose number is identified in the working DRG record is brought into the working memory of the computer Step 53 looks at the Content Code of that Related DRG and will proceed to step 55 only if it is different than that of any Content Code in the Selected Content Code List. If there is this difference, the DRG remains valid and the next step 55 compares the patient's sex with that required to be in the Related DRG. If that comparison is positive, the next step 57 asks whether the patient's age, obtained from the patient database, is within the Age Range of the related DRG. If so, the number and textual description of the Related DRG are selected for printing in step 59. If the Related DRG is rejected by any of the steps 53, 55 or 57, the process is looped back through a step 67 to proceed to the next of the Related DRGs that is listed in the Working DRG database record.

After the Related DRG is selected for printing, its Content Code is added in a step 61 to the list and memory of Content Codes that was initialized in step 47. That Content Code is then available for comparison in step 53 with that of subsequent related DRGs that go through this same process. The process step 63 examines whether each DRG just selected for printing is the last of the list, and if it is, the entire report Form A is constructed in memory by a step 65 for later communication to the physician, preferably by printing. If in the step 63 it is determined that there are additional Related DRGs, then the process is repeated by going through the process step 67 that increments to the next Related DRG.

FIG. 3 shows a posssible format for the report Form A that is constructed in memory by the process of FIG. 2 and which may be printed on paper or otherwise displayed. A top portion 73 preferably contains routine information of the patient obtained from the current patient file 29 (FIG. 4), such as the name, sex, age, attending physician, billing code numbers, and similar matters. The patient database also optionally includes medical information of the patient, such as a principal diagnosis from the attending physician in his or her own words, and other information, and this may be printed in a region 75. Below that is printed information of the Working DRG, including its number 77 and its description or title 79 as it appears in the DRG database record. An area 81 adjacent the description can optionally carry other information printed directly from the DRG record, such as Average Weight, Mean LOS, and Outlier Cutoffs.

An area 83 is provided in a prominent position, here shown to be under the Working DRG description, for carrying either of the messages of steps 43 and 45 of FIG. 2 if appropriate for the given patient and the Working DRG characteristics. The area 83 will alternatively be blank if neither of those statements is printed, thus giving the physician only what he or she can use.

In the lower part of the form are listed the Related DRGs that are selected in a step 59 of FIG. 2 for printing on the form. The number, title or description and other information from the individual DRG database records is printed on successive lines. As explained earlier, the system of FIG. 2 limits the amount of information to only that which can be relevant. The attending physician, when reviewing this report in connection with treating the patient, can easily designate in an area provided, such as an area 85 to the left of a related DRG, that that DRG is more appropriate than the currently designated Working DRG. If a Form A1 is attached because a C.C. could change the DRG, then the physician also checks the appropriate complication or comorbidities that are appropriate for the patient. When Form A and A1, if provided, are returned to the computer operator, the process of FIG. 2 is repeated by the computer operator changing the Working DRG in the patient information file to the selected related DRG.

The use of the form 71 in a hospital may be better shown by FIG. 4. The initial working DRG is selected and stored in the current patient file 29 at the time that a patient is admitted to the hospital. The form 71, and the optional second page Form A1, are then included in a prominent position on a patient's chart 87. That form, along with the entire chart, is used by the physician and any designations of a Related DRG or C.C. information provided by him or her are then returned to update the record for that patient in the current patient file, particularly changing the Working DRG number. If there is such a change, a new report form or forms are generated and placed with the patient chart 87 for use by the physician. This cycle is conveniently one that occurs once a day so that by the time the patient is discharged from the hospital, the Working DRG has been finely tuned.

Once discharged, the patient chart and the physician determined DRG number are sent to the medical records clerical department of the hospital where ICD-9 codes are identified for all the diagnoses and procedures in accordance with usual techniques. But the medical records clerk now has the physician determined DRG with which to compare. Additionally, form A1 will alert the medical records clerk to additional C.C.s that may be relevant. Further, if the DRG text in the DRG database is expanded, the medical records clerk has the text of the Working DRG as an aid.

In fact, this comparison can be automated, as shown in FIG. 5 wherein a comparator 91 receives as one input 93 the DRG number determined by the physician in accordance with the procedure of FIG. 4 using the computer system of this invention. The second input 95 is a DRG number determined by running a prior art Grouper program 97 which operates from a plurality of ICD-9 code numbers identified by the medical records clerk. A system can even be used that would respond directly to each ICD-9 code inputted to it by the medical records clerk and indicate at the output of the comparator 91 when enough ICD-9 codes have been entered so that the DRG that is calculated by the Grouper program is the same as that determined by the attending physician. Since the Government utilizes the same Grouper program to determine the DRG from the ICD-9 codes, only enough need be looked for in the patient chart and entered into the Grouper program 97 until a positive comparison is made.

Throughout this description, the computer system has been shown being used interactively with the attending physician reviewing its report output and communicating certain information for input to the system by a computer operator. However, it will be recognized that the computer system is also highly useful when other medical personnel are involved along with the physician or in place of the physician. For example, in a hospital, a floor nurse or utilization review administrative person could be advantageously involved.

Although the various aspects of the present invention have been described with respect to a specific embodiment thereof, it will be understood that the invention is entitled to protection within the full scope of the appended claims.

TABLE I

SAMPLE DIAGNOSIS RELATED GROUPS (DRGs) AS PUBLISHED IN FEDERAL REGISTER SEPTEMBER 1, 1983

| DRG | MDC | TITLE | RELATIVE WEIGHT | MEAN LOS | OUTLIER CUTOFFS |
|---|---|---|---|---|---|
| 16 | 1 MED | NONSPECIFIC CEREBRO-VASCULAR DISORDERS WITH C.C. | 0.8592 | 7.4 | 27 |
| 17 | 1 MED | NONSPECIFIC CEREBRO-VASCULAR DISORDERS WITHOUT C.C. | 0.8592 | 7.2 | 27 |
| 34 | 1 MED | OTHER DISORDERS OF NERVOUS SYSTEM AGE >69 AND/OR C.C. | 0.9927 | 7.1 | 27 |
| 35 | 1 MED | OTHER DISORDERS OF NERVOUS SYSTEM AGE <70 WITHOUT C.C. | 0.8480 | 6.2 | 26 |
| 96 | 4 MED | BRONCHITIS & ASTHMA AGE >69 AND/OR C.C. | 0.7996 | 6.9 | 24 |
| 97 | 4 MED | BRONCHITIS & ASTHMA AGE 18-69 WITHOUT C.C. | 0.7256 | 6.2 | 21 |
| 98 | 4 MED | BRONCHITIS & ASTHMA AGE 0-17 | 0.4275 | 3.7 | 11 |
| 261 | 9 SURG | BREAST PROC FOR NON-MALIG EXCEPT BIOPSY & LOC EXC | 0.7329 | 4.8 | 19 |

TABLE II

DERIVED DRG INFORMATION

| DRG | AGE RANGE | C.C. MOVE | C.C. AGE | CONTENT CODE | SEX | RELATED DRGs |
|---|---|---|---|---|---|---|
| 16 | 0-124 | NO | 0-124 | 11 | B | 13, 12, 14, 15, 22, 17 |
| 17 | 0-124 | YES | 0-124 | 11 | B | 12, 13, 14, 15, 22, 16 |
| 34 | 0-124 | NO | 0-69 | 23 | B | 9, 12, 13, 35, 19, 18 |
| 35 | 0-69 | YES | 0-69 | 23 | B | 9, 12, 13, 14, 19, 23, 34 |
| 96 | 0-124 | NO | 0-69 | 81 | B | 69 89, 71 91, 88 99, 100 79, 90 81 |

TABLE II-continued

DERIVED DRG INFORMATION

| DRG | AGE RANGE | C.C. MOVE | C.C. AGE | CONTENT CODE | SEX | RELATED DRGs |
|---|---|---|---|---|---|---|
| 97 | 18-69 | YES | 18-69 | 81 | B | 80 68, 69 68, 71 70, 88 99, 100 89, 90 79, 80 |
| 98 | 0-17 | YES | 0-17 | 81 | B | 70, 71, 88, 100, 81, 91 |
| 261 | 0-124 | NO | 125-125 | 239 | F | 265, 288, 293, 292 |

TABLE III

TUBERCULOSIS (010-018)

The following fifth-digit subclassification is for use with categories 010-018:

| | |
|---|---|
| 0 | unspecified |
| 1 | bacteriological or histological examination not done |
| 2 | bacteriological or histological examination unknown (at present) |
| 3 | tubercle bacilli found (in sputum) by microscopy |
| 4 | tubercle bacilli not found (in sputum) by microscopy, but found by bacterial culture |
| 5 | tubercle bacilli not found by bacteriological examination, but tuberculosis confirmed histologically |
| 6 | tubercle bacilli not found by bacteriological or histological examination but tuberculosis confirmed by other methods [inoculation of animals] |

§011 Pulmonary tuberculosis
[Use additional code, if desired, to identify any associated silicosis (502)]
011.0 Tuberculosis of lung, infiltrative
011.1 Tuberculosis of lung, nodular
011.2 Tuberculosis of lung with cavitation
011.3 Tuberculosis of bronchus
[Excludes isolated bronchial tuberculosis (012.2)]

TABLE III-continued
TUBERCULOSIS (010–018)

| | |
|---|---|
| 011.4 Tuberculous fibrosis of lung | |
| 011.5 Tuberculous bronchiectasis | |
| 011.6 Tuberculous pneumonia [any form] | 5 |
| 011.7 Tuberculous pneumothorax | |
| 011.8 Other specified pulmonary tuberculosis | |
| 011.9 Pulmonary tuberculosis, unspecified Respiratory tuberculosis NOS Tuberculosis of lung NOS | |
| §018 Miliary tuberculosis | |
| Includes tuberculosis: | 10 |
| disseminated | |
| generalized | |
| miliary, whether of a single specified site, multiple sites, or unspecified site | |
| polyserositis | 15 |
| 018.0 Acute miliary tuberculosis | |
| 018.8 Other specified miliary tuberculosis | |
| 018.9 Miliary tuberculosis, unspecified | |

APPENDIX I

```
 1    /*
 2    FORM1.C - 3-Feb-1984 (Copr. 1984 Iameter Incorporated)
 3
 4    Function:
 5          Produce a proto-type DVS form for checking IAMETER text
and report
 6          data items under developement. Patient Age and Sex, com
bined with
 7          DRG information in files maintained by IAMETER programs,
are used to
 8          produce this form.
 9
10    Parameters:
11          None
12
13    Environment:
14          Input files DRGTXT.DAT, DRGPAR.DAT, and DRGRPT.DAT are r
equired in the
15          default directory of the user. All files are stream fil
es with fixed
16          length records. Records are ASCII characters terminated
by '\n'
17          characters.
18
19    Notes:
20          File formats are properly documented in the maintainence
 programs for
21          each file, but are mentioned here also:
22
23                  DRGTXT.DAT - Text file
24          #DRG001)............................................
25          text 1 ...... DRGTXTSZ characters, ...........
26          text 2 ...... the last one being '\n' ........ for DRG
#1 to DRG
27          text DRGLINES ............................. DRGM
AX
28          #ENDTEXT ..........................................
29
30          Each record uses DRGTXTSZ bytes (depending on implementa
tion), and each
31          DRG used (DRGLINES+2)*DRGTXTSZ bytes for DRGLINES of tex
t.
32
33                  DRGPAR.DAT - Parameter file
34          #DRGnnn. <weight> <avg-los> <high-trim>
35
36          nnn      : DRG number. 1 <= nnn <= DRGMAX.
37          <weight> : DRG weight. 0.1 <= weight <=20. Format is %8
.4f.
38          <avg-los>: Average LOS (days). 0 <= avg-los <= 365. For
mat is %6.1f.
39          <high-trim>: High trim time for this DRG. 0 <= high-trim
 <= 365, and
40                     format is %7.1f.
41
42          Each record uses DRGPARSZ bytes (depending on implementa
tion).
43
44                  DRGRPT.DAT - Report attributes file
45          #DRGnnn. <sex> <age> <cc_move> <cc> <concode>
46
47          nnn    : DRG number. 1 <= nnn <= DRGMAX.
48          <sex>  : Allowed sex, 1=MALE, 2=FEMALE, 3=BOTH
49          <age>  : Age range, Low:High. Maximum age is defined
as MAXAGE.
```

```
 50              <cc move>: Will C.C. change this CC? (Y/N).
 51              <cc>      : Age range to alter complications information. Format is
 52                        Low:High. Maximum age is defined as MAXAGE. Note that
 53                        0:MAXAGE means ALWAYS. and that MAXAGE+1:MAXAGE+1 means
 54                        NEVER deal with complications.
 55              <concode>: Content code. DRGs with the same content code have
 56                        equivalent meaning but necessarily equivalent text.
 57                        Note: Content codes start at 1001 and are never more than
 58                        1000+DRGMAX.
 59
 60              #DRGnnn- <od1> <od2> ... <odMAXODR>
 61
 62              nnn     : DRG number. 1 <= nnn <= DRGMAX.
 63              <od1>   : First other DRG number. Continue for up to MAXODR numbers.
 64
 65              Note: All numeric formats in this file are "%03d" except for
 66                    concode which uses "%04d". Each record requires
 67                    DRGRPTSZ bytes, and each entry requires 2*DRGRPTSZ bytes depending
 68                    on implementation.
 69         */
 70
 71 .
 72         #include stdio
130         #include "iamdef:iamp1"
152         #include "iamdef:iamp2"
242         #include "iamdef:tty"
283
284         /*
285             DB file definitions
286         */
287         #define TXT_FILE        'TX'
288         #define PAR_FILE        'PA'
289         #define RPT_FILE        'RP'
290
291
292         /*  Data item definitions  */
293         struct TXT { TXT_REC ln[DRGLINES]; };        /* TXT items definition */
294         struct PAR                                   /* PAR items definition */
295             {
296                 float wat;       /* DRG weight */
297                 float a_los;     /* Average LOS */
298                 float htrm;      /* High trim */
299             };
300         struct RPT                                   /* RPT items definition */
301             {
302                 int a_sex;       /* Allowed sex */
303                 int a_lage;      /* Allowed low age */
304                 int a_hage;      /* allowed high age */
305                 int ccmove;      /* CC move */
306                 int a_lcc;       /* Low age for CC */
307                 int a_hcc;       /* High age for CC */
308                 int a_ccode;     /* Content code */
309                 int nother;      /* Count of other DRG's and */
310                 int od[MAXODR+1]; /* Other drg's */
311             };
312
313         #define NEVER(x,y)    (x==MAXAGE+1 && y==MAXAGE+1)   /* Age never applies */
314         #define ALWAYS(x,y)   (x==0 && y==MAXAGE)            /* Age always applies*/
315
316
317         /*
318             Global storage
319         */
320         FILE *txtfl,*parfl,*rptfl;       /* file pointers for DB files */

321         int pdno;                        /* primary DRG number */
322         int sdno;                        /* secondary DRG number */
323
324         PAR_REC parr;                    /* BUF for primary PAR */
325         RPT_REC rptr;                    /* BUF for primary RPT */
326
327         struct TXT txt;                  /* BUF and data items are same */
328         struct PAR par;                  /* data from primary PAR entry */
329         struct RPT rpt;                  /* data from primary RPT entry */
```

```
330          struct RPT srpt;                /* data from secondary RPT entry */
331
332          char sexmap[] = "*MFB";         /* sex to code map */
333          char movemap[] = "NY";          /* CC move */
334          char RPTFM1[] = "%d %d:%d %d %d:%d %d"; /* Format for RPT line 1 and 2 */
335          char RPTFM2[] = "%d %d %d %d %d %d %d %d %d %d %d %d %d %d %d";
336          char PARFMT[] = "%f %f %f";     /* Format for PAR line */
337
338
339          main()
340          /*
341                  Obtain DRG, SEX, AGE and show DB infor and make test form for
342                  DVS product.
343          */
344          {
345   1      int drgno;                      /* requested DRG number */
346   1      int age;                        /* patients age */
347   1      int sex;                        /* patients sex */
348   1      char reply[TTMAX+1];            /* User reply buffer */
349   1      char sawcodes[DRGMAX];          /* already printed OTHER DRG list */
350   1
351   1      int i,j,dno;                    /* Scratch variables */
352   1      LOGICAL ccprint;
353   1      char c;
354   1
355   1
356   1      init_all();                     /* open files etc. */
357   1      for (;;)                        /* loop processing input until EOF or exit command */
358   1      {
359   2          printf("\n\n");
360   2          /*
361   2              Establish Patient Parameters - DRG, Sex, and Age
362   2          */
363   2          do
364   2          {
365   3              printf("\nDRG #? ");
366   3              if ( !gets(reply) || strlen(reply)<1 ) close_all(SUCCESS);
367   3              if ( (c=tolower(reply[0]))=='e' ) close_all(SUCCESS);
368   3              if ( c=='a' )
369   3                  { printf("\nAborting per request"); close_all(ERR); };
370   3              if ( !sscanf(reply,"%d",&drgno) ) drgno=DRGMAX+1;
371   3          }
372   2          while ( 1>drgno || drgno>DRGMAX );
373   2
374   2          do
375   2          {
376   3              printf("\nSex (M/F)? ");
377   3              if ( !gets(reply) || strlen(reply)<1 ) close_all(SUCCESS);
378   3              if ( (c=tolower(reply[0]))=='e' ) close_all(SUCCESS);
379   3              if ( c=='a' )
380   3                  { printf("\nAborting per request"); close_all(ERR); };
381   3              reply[0]=toupper(reply[0]); reply[1]=NULL;
382   3              sex=strcspn(sexmap,reply);
383   3          }
384   2          while ( !(sex==MALE || sex==FEMALE) );
385   2
386   2          do
387   2          {
388   3              printf("\nAge (0->%d) ",MAXAGE);
389   3              if ( !gets(reply) || strlen(reply)<1 ) close_all(SUCCESS);
390   3              if ( (c=tolower(reply[0]))=='e' ) close_all(SUCCESS);
391   3              if ( c=='a' )
392   3                  { printf("\nAborting per request"); close_all(ERR); };
393   3              if ( !sscanf(reply,"%d",&age) ) age=MAXAGE+1;
394   2          }
395   2          while ( 0>age || age>MAXAGE );
396   2          printf("\nPatient Info === %sDRG: %d, Sex: %d, Age: %d%s",
397   2              V_RVID,drgno,sex,age,V_NORMAL);
398   2
399   2          /*
400   2              Obtain all data for PRIMARY DRG
401   2          */
```

```
402   2         getprim(drgno);                    /* RPT, TXT, and PAR */
403   2
404   2
405   2         /*      Patient Validation    */
406   2         /*      Check for Sex    */
407   2         if ( sex & rpt.a_sex )
408   2                 printf("\n\nPatient's sex is valid in this DRG");
409   2         else
410   2             {
411   3                 printf("\n\007%sPatients sex is INVALID in this DRG%s",
412   3                         V_RVID,V_NORMAL);
413   3                 continue;
414   3             };
415   2
416   2         /*      Check for Age    */
417   2         if ( rpt.a_lage<=age && age<=rpt.a_hage )
418   2                 printf("\nPatient's age is valid in this DRG");
419   2         else
420   2             {
421   3                 printf("\n\007%sPatients age is INVALID in this DRG%s",
422   3                         V_RVID,V_NORMAL);
423   3                 continue;
424   3             };
425   2
426   2         /*
427   2                 Output Form - ready follow along printer first
428   2         */
429   2         printf("\n\nReady printing and type Y for form else N (default y): ");
430   2         if ( !gets(reply) ) continue;
431   2         if ( strlen(reply)>0 && tolower(reply[0])=='n' ) continue;
432   2
433   2         printf("\f");
434   2         for (i=0; i<5; i++) printf("\n ... demographic data ...");
435   2
436   2         printf("\n\n\nDRG    AGE    IAMETER Inc. Text");
437   2         printf("\n%03d    %3d    %s",drgno,age,&txt.ln[0]);
438   2         for (i=1; i<DRGLINES; i++)
439   2                 printf("                   %s",&txt.ln[i]);
440   2
441   2         ccprint=FALSE;
442   2         switch ( rpt.ccmove )
443   2             {
444   3             case NO:
445   3                 if ( rpt.a_lcc<=age && age<=rpt.a_hcc )
446   3                         printf("                   Complications already noted\n");
447   3                 break;
448   3
449   3             case YES:
450   3                 if ( rpt.a_lcc<=age && age<=rpt.a_hcc )
451   3                         { ccprint=TRUE;  printf("                   Look for C.C.\n"); };
452   3                 break;
453   3
454   3             default:
455   3                 kabort("Bad CC move");
456   3             };
457   2
458   2         /*      Process OTHER DRG's    */
459   2         setmem(&sawcodes,sizeof sawcodes,NULL);
460   2         sawcodes[rpt.a_ccode-CODEBASE] = 1;
461   2         for (i=0; i<rpt.nother; i++)
462   2             {
463   3                 getother( (dno=rpt.od[i]) );
464   3                 if ( !(sex & srpt.a_sex) ) continue;
465   3                 if ( age<srpt.a_lage || age>srpt.a_hage ) continue;
466   3                 j=srpt.a_ccode-CODEBASE;           /* skip same content code */
467   3                 if ( sawcodes[j] ) continue;
468   3                 sawcodes[j]=1;
469   3                 printf("\n\n%03d          %s",dno,&txt.ln[0]);
470   3                 for (j=1; j<DRGLINES; j++)
471   3                         printf("                   %s",&txt.ln[j]);
472   3             };
473   2
474   2         /*      C.C. if required    */
475   2         if ( ccprint )
476   2                 printf("\n\n---- C. C. ----");
477   2         printf("\f");
478   2         };
479   1     exit(SUCCESS);
480   1     }
481
```

```
482
483                 int getprim(drgno)
484         /*      Obtain DB infor for primary DRG          */
485                 int drgno;       /* DRG number for DB access */
486         (       long int locate();       /* Direct access to DB info by DRG# */
487     1           int i;
488     1
489     1
490     1           /*
491     1                   RFT: Pick up primary DRG Sex, Age, CC_move, CC and Content code
492     1           */
493     1           locate(RFT_FILE,drgno);
494     1           if ( !fgets(rptr,sizeof rptr,rptf1) ) kabort("RFT read1 after seek");
495     1           if ( !sscanf(&rptr[DATACOL],RFTFM1,
496     1                   &rpt.a_sex,&rpt.a_lage,&rpt.a_hage,
497     1                   &rpt.ccmove,&rpt.a_lcc,&rpt.a_hcc,&rpt.a_ccode) )
498     1                   kabort("Error parsing RFT1");
499     1           if ( !fgets(rptr,sizeof rptr,rptf1) ) kabort("RFT read2 after seek");
500     1           if ( !sscanf(&rptr[DATACOL],RFTFM2,
501     1                   &rpt.od[00],&rpt.od[01],&rpt.od[02],&rpt.od[03],
502     1                   &rpt.od[04],&rpt.od[05],&rpt.od[06],&rpt.od[07],
503     1                   &rpt.od[08],&rpt.od[09],&rpt.od[10],&rpt.od[11],
504     1                   &rpt.od[12],&rpt.od[13],&rpt.od[14],&rpt.od[15],
505     1                   &rpt.od[16]) )
506     1                   kabort("Error parsing RFT2");
507     1           rpt.od[MAXODR]=EDRG;             /* Force end and count entries */
508     1           rpt.nother= -1; while ( rpt.od[++rpt.nother]!=EDRG );
509     1
510     1           /*      Display RFT info       */
511     1           printf("\n\nRFT file info for DRG%03d:",drgno);
512     1           printf("\n\tSex=%c     Low : High",sexmap[rpt.a_sex]);
513     1           printf("\n\tAge:       %3d   %3d",rpt.a_lage,rpt.a_hage);
514     1           if NEVER(rpt.a_lage,rpt.a_hage) printf(" - Noone fits");
515     1           if ALWAYS(rpt.a_lage,rpt.a_hage) printf(" - All Patients fit");
516     1           printf("\n\tC.C. Age   %3d   %3d",rpt.a_lcc,rpt.a_hcc);
517     1           if NEVER(rpt.a_lcc,rpt.a_hcc) printf(" - C.C. NEVER applies");
518     1           if ALWAYS(rpt.a_lcc,rpt.a_hcc) printf(" - C.C. ALWAYS applies");
519     1           if ( rpt.ccmove )
520     1                   printf("\n\tC.C. WILL move patient to another DRG");
521     1           else
522     1                   printf("\n\tC.C. doesn't alter DRG");
523     1           printf("\n\tContent code: %4d",rpt.a_ccode);
524     1           printf("\nOther DRG list: ");
525     1           if ( rpt.nother )
526     1                   for (i=0; i<rpt.nother; i++) printf(" %03d",rpt.od[i]);
527     1           else printf(" None.");
528     1
529     1
530     1           /*
531     1                   Obtain primary DRG TEXT
532     1           */
533     1           locate(TXT_FILE,drgno);          /* Position and skip header */
534     1           if ( !fgets(&txt.ln[0],sizeof txt.ln[0],txtf1) )
535     1                   kabort("Error in TXT");
536     1           printf("\n\nTXT file info for DRG%03d:\n",drgno);
537     1           for (i=0; i<DRGLINES; i++)
538     1               {
539     2                   if ( !fgets(&txt.ln[i],sizeof txt.ln[i],txtf1) )
540     2                           kabort("Error in TXT");
541     2                   printf("\t%s",&txt.ln[i]);
542     2               };
543     1
544     1           /*
545     1                   Obtain PAR info - weight, LOS and TRIM
546     1           */
547     1           locate(PAR_FILE,drgno);
548     1           if ( !fgets(parr,sizeof parr,parf1) ) kabort("PAR read after seek");
549     1           if ( !sscanf(&parr[DATACOL],PARFMT,
550     1                   &par.wgt,&par.a_los,&par.htrm) )
551     1                   kabort("Error parsing PAR");
552     1           printf("\nPAR file info for DRG%03d:",drgno);
```

```
553    1              printf("\n\tWeight %8.4f,  Avg-LOS: %6.1f,  High-Trim: %
7.1f",
554    1                      par.wgt,par.a_los,par.htrm);
555    1              return;
556    1          }
557
558
559         int getother(drgno)
560         /*     Obtain subset of DB infor for other DRG              */
561         int drgno;      /* DRG number for DB access */
562         {       long int locate();       /* Direct access to DB info by D
RG# */
563    1          int i;
564    1
565    1
566    1          /*
567    1                  RPT: Pick up other DRG Sex, Age, CC_move, CC an
d Content code
568    1          */
569    1          locate(RPT_FILE,drgno);
570    1          if ( !fgets(rptr,sizeof rptr,rptfl) ) kabort("RPT read1
 after seek");
571    1          if ( !sscanf(&rptr[DATACOL],RPTFM1,
572    1                  &srpt.a_sex,&srpt.a_lage,&srpt.a_hage,
573    1                  &srpt.ccmove,&srpt.a_lcc,&srpt.a_hcc,&srpt.
a_ccode) )
574    1              kabort("Error parsing RPT1");
575    1
576    1          /*
577    1              Obtain other DRG TEXT
578    1          */
579    1          locate(TXT_FILE,drgno);          /* Position and skip hea
der */
580    1          if ( !fgets(&txt.ln[0],sizeof txt.ln[0],txtfl) )
581    1                  kabort("Error in TXT");
582    1          for (i=0; i<DRGLINES; i++)
583    1          {
584    2              if ( !fgets(&txt.ln[i],sizeof txt.ln[i],txtfl) )
585    2                  kabort("Error in TXT");
586    2          };
587    1          return;
588    1      }
589
590
591         long int locate(f,rec)
592         /*     Locate record in file by calculating byte position */
593         int f;          /* file to locate */
594         int rec;        /* record to find */
595         {       FILE **fptr;
596    1          long int offset;
597    1
598    1      #ifdef   vaxllc
599    1      #define TXT_OFF(x)    ((2+DRGLINES)*DRGTXTSZ*((long)x-1))
       /* TXT */
600    1      #define PAR_OFF(x)    (DRGPARSZ*((long)x-1))   /* Byte offset f
or PAR rec x */
601    1      #define RPT_OFF(x)    (2*DRGRPTSZ*((long)x-1))/* Byte offset f
or RPT rec x */
602    1      #endif
603    1      #ifdef   pcdos
604    X      #define TXT_OFF(x)    ((2+DRGLINES)*(DRGTXTSZ+1)*((long)x-1))
       /* TXT */
605    X      #define PAR_OFF(x)    ((DRGPARSZ+1)*((long)x-1))    /* Byte f
or PAR rec x */
606    X      #define RPT_OFF(x)    (2*(DRGRPTSZ+1)*((long)x-1))   /* Byte f
or RPT rec x */
607    1      #endif
608    1
609    1          switch (f)
610    1          {
611    2              case TXT_FILE: fptr=txtfl; offset=TXT_OFF(rec); b
reak;
612    2              case PAR_FILE: fptr=parfl; offset=PAR_OFF(rec); b
reak;
613    2              case RPT_FILE: fptr=rptfl; offset=RPT_OFF(rec); b
reak;
614    2              default:  kabort("Bad file to seek");
615    2          };
616    1          if ( fseek(fptr,offset,0) ) kabort("Seek failed");
617    1          return (offset);
618    1      }
619
620
621         int init_all()
622         {       FILE **fopen();
623    1
624    1          printf("\n\nFORM1 - Prototype DVS form 1\n");
625    1          if ( !(txtfl=fopen("drgtxt.dat","r")) ) kabort("Unable t
o open TXT");
626    1          if ( !(parfl=fopen("drgpar.dat","r")) ) kabort("Unable t
```

```
o open PAR");
627    1                   if ( !(rptfl=fopen("drgrpt.dat","r")) ) kabort("Unable t
o open RPT");
628    1                   return (0);
629    1           }
630
631
632            int close_all(status)
633            /*      Close out file and finish up      */
634            int status;     /* Error status */
635            {
636    1                   printf("\n\nEnd of FORM1\n");
637    1                   if ( fclose(txtfl) ) kabort("Unable to close TXT");
638    1                   if ( fclose(parfl) ) kabort("Unable to close PAR");
639    1                   if ( fclose(rptfl) ) kabort("Unable to close RPT");
640    1                   exit(status);
641    1           }
642
643
644            int kabort(msg)
645            /*      Abort with a message      */
646            char *msg;       /* Error message from caller */
647            {
648    1                   printf("\n?FORM1 - %s\n",msg);
649    1                   exit(ERR);
650    1           }
```

+---------------+
| Storage Map   |
+---------------+

External Declarations
---------------------

| Identifier Name | Line | Size | Class | Type |
|---|---|---|---|---|
| c$v_stdiodefs | 78 | 1 longword | Globalvalue | Long int |
| close_all | 632 | | Extern def. | Function r |
| eturning long int | | | | |
| DRGDSC_REC | 210 | 81 bytes | | Typedef: |
| array [81] of char | | | | |
| fdopen | 129 | | Extern | Function r |
| eturning pointer to struct _iobuf | | | | |
| fgetname | 125 | | Extern | Function r |
| eturning pointer to char | | | | |
| fgets | 125 | | Extern | Function r |
| eturning pointer to char | | | | |
| fopen | 129 | | Extern | Function r |
| eturning pointer to struct _iobuf | | | | |
| freopen | 129 | | Extern | Function r |
| eturning pointer to struct _iobuf | | | | |
| ftell | 127 | | Extern | Function r |
| eturning long int | | | | |
| getother | 559 | | Extern def. | Function r |
| eturning long int | | | | |
| getprim | 483 | | Extern def. | Function r |
| eturning long int | | | | |
| INF | 215 | 483 bytes | | Structure |
| tag | | | | |
| drgno | 217 | 1 longword | | Member (o |
| ffset = 0), long int | | | | |
| mdcno | 218 | 1 longword | | Member (o |
| ffset = 4 bytes), long int | | | | |
| mdc_ln | 220 | 81 bytes | | Member (o |
| ffset = 8 bytes), array of char | | | | |
| dsc_ln | 221 | 81 bytes | | Member (o |
| ffset = 89 bytes), array of char | | | | |
| txt_ln | 223 | 201 bytes | | Member (o |
| ffset = 170 bytes), array [3][] of char | | | | |
| wgt | 225 | 1 longword | | Member (o |
| ffset = 371 bytes), float | | | | |
| a_los | 226 | 1 longword | | Member (o |
| ffset = 375 bytes), float | | | | |
| htrm | 227 | 1 longword | | Member (o |
| ffset = 379 bytes), float | | | | |
| a_sex | 229 | 1 longword | | Member (o |
| ffset = 383 bytes), long int | | | | |
| a_lage | 230 | 1 longword | | Member (o |
| ffset = 387 bytes), long int | | | | |
| parfl | 320 | 1 longword | Extern def. | Pointer to |
| struct _iobuf | | | | |
| PARFMT | 336 | 9 bytes | Extern def. | Initialize |
| d array [9] of char | | | | |
| parr | 324 | 81 bytes | Extern def. | Array of c |
| har | | | | |
| PAR_REC | 208 | 81 bytes | | Typedef: |
| array [81] of char | | | | |
| pdno | 321 | 1 longword | Extern def. | Long int |

| Identifier Name | Line | Size | Class | Type |
|---|---|---|---|---|
| RPT tag | 300 | 100 bytes | | Structure |
| a_sex ffset = 0), long int | 302 | 1 longword | | Member (o |
| a_lage ffset = 4 bytes), long int | 303 | 1 longword | | Member (o |
| a_hage ffset = 8 bytes), long int | 304 | 1 longword | | Member (o |
| ccmove ffset = 12 bytes), long int | 305 | 1 longword | | Member (o |
| a_lcc ffset = 16 bytes), long int | 306 | 1 longword | | Member (o |
| a_hcc ffset = 20 bytes), long int | 307 | 1 longword | | Member (o |
| a_ccode ffset = 24 bytes), long int | 308 | 1 longword | | Member (o |
| nother ffset = 28 bytes), long int | 309 | 1 longword | | Member (o |
| od ffset = 32 bytes), array [17] of long int | 310 | 17 longwords | | Member (o |
| rpt | 329 | 100 bytes | Extern def. | Struct RPT |
| a_sex ffset = 0), long int | 302 | 1 longword | | Member (o |
| a_lage ffset = 4 bytes), long int | 303 | 1 longword | | Member (o |
| a_hage ffset = 8 bytes), long int | 304 | 1 longword | | Member (o |
| ccmove ffset = 12 bytes), long int | 305 | 1 longword | | Member (o |
| a_lcc ffset = 16 bytes), long int | 306 | 1 longword | | Member (o |
| a_hcc ffset = 20 bytes), long int | 307 | 1 longword | | Member (o |
| a_ccode ffset = 24 bytes), long int | 308 | 1 longword | | Member (o |
| nother ffset = 28 bytes), long int | 309 | 1 longword | | Member (o |
| od ffset = 32 bytes), array [17] of long int | 310 | 17 longwords | | Member (o |
| rptfl struct _iobuf | 320 | 1 longword | Extern def. | Pointer to |
| RPTFM1 d array [21] of char | 334 | 21 bytes | Extern def. | Initialize |
| _flag ffset = 12 bytes), char | 86 | 1 byte | | Member (o |
| _file ffset = 13 bytes), char | 97 | 1 byte | | Member (o |

Function "main" defined at line 339
-----------------------------------

| Identifier Name | Line | Size | Class | Type |
|---|---|---|---|---|
| age | 346 | 1 longword | Auto | Long int |
| c | 353 | 1 byte | Register | Char |
| ccprint hort int | 352 | 1 word | Register | Unsigned s |
| close_all eturning long int | 366 | | Extern | Function r |
| dno | 351 | 1 longword | Register | Long int |
| drgno | 345 | 1 longword | Auto | Long int |
| exit eturning long int | 479 | | Extern | Function r |
| getother eturning long int | 463 | | Extern | Function r |
| getprim eturning long int | 402 | | Extern | Function r |
| gets eturning long int | 366 | | Extern | Function r |
| i | 351 | 1 longword | Register | Long int |
| init_all eturning long int | 356 | | Extern | Function r |
| j | 351 | 1 longword | Register | Long int |
| abort eturning long int | 455 | | Extern | Function r |
| printf eturning long int | 359 | | Extern | Function r |
| reply ] of char | 348 | 129 bytes | Auto | Array [129 |
| sexcodes ] of char | 349 | 470 bytes | Auto | Array [470 |
| setmem eturning long int | 459 | | Extern | Function r |
| sex | 347 | 1 longword | Register | Long int |

| Identifier Name | Line | Size | Class | Type |
|---|---|---|---|---|
| sscanf eturning long int | 370 | | Extern | Function r |
| strcspn eturning long int | 382 | | Extern | Function r |
| strlen eturning long int | 366 | | Extern | Function r |
| tolower eturning long int | 367 | | Extern | Function r |
| toupper eturning long int | 381 | | Extern | Function r |

Function "getprim" defined at line 483
----------------------------------------

| Identifier Name | Line | Size | Class | Type |
|---|---|---|---|---|
| drgno | 485 | 1 longword | | Parameter |
| # 1, long int | 487 | 1 longword | Register | Long int |
| i | 494 | | Extern | Function r |
| kabort eturning long int | 486 | | Extern | Function r |
| locate eturning long int | 511 | | Extern | Function r |
| printf eturning long int | 497 | | Extern | Function r |
| sscanf eturning long int | | | | |

Function "getother" defined at line 559
----------------------------------------

| Identifier Name | Line | Size | Class | Type |
|---|---|---|---|---|
| drgno | 561 | 1 longword | | Parameter |
| # 1, long int | 563 | 1 longword | Register | Long int |
| i | 570 | | Extern | Function r |
| kabort eturning long int | 562 | | Extern | Function r |
| locate eturning long int | 573 | | Extern | Function r |
| sscanf eturning long int | | | | |

Function "locate" defined at line 591
----------------------------------------

| Identifier Name | Line | Size | Class | Type |
|---|---|---|---|---|
| f | 593 | 1 longword | | Parameter |
| # 1, long int fptr | 595 | 1 longword | Register | Pointer to struct _iobuf |
| fseek | 616 | | Extern | Function r |
| eturning long int kabort | 614 | | Extern | Function r |
| eturning long int offset | 596 | 1 longword | Register | Long int |
| rec | 594 | 1 longword | | Parameter |
| # 2, long int | | | | |

Function "init_all" defined at line 621
----------------------------------------

| Identifier Name | Line | Size | Class | Type |
|---|---|---|---|---|
| fopen eturning pointer to struct _iobuf | 622 | | Extern | Function r |
| kabort eturning long int | 625 | | Extern | Function r |
| printf eturning long int | 624 | | Extern | Function r |

Function "close_all" defined at line 632
----------------------------------------

| Identifier Name | Line | Size | Class | Type |
|---|---|---|---|---|
| exit eturning long int | 648 | | Extern | Function r |
| fclose eturning long int | 637 | | Extern | Function r |
| kabort eturning long int | 637 | | Extern | Function r |
| printf eturning long int | 636 | | Extern | Function r |
| status # 1, long int | 634 | 1 longword | | Parameter |

Function "kabort" defined at line 644
----------------------------------------

| Identifier Name | Line | Size | Class | Type |
|---|---|---|---|---|
| exit eturning long int | 649 | | Extern | Function r |
| msg # 1, pointer to char | 646 | 1 longword | | Parameter |
| printf eturning long int | 648 | | Extern | Function r |

Psect Synopsis
--------------

| Psect Name | Allocation | Attributes |
|---|---|---|
| $CODE | 26174 bytes | Position-independent, relocatable, shareable, executable, readable |
| _IOB | 280 bytes | Position-independent, overlay, relocatable, global, shareable, readable, writeable |
| TXTFL | 4 bytes | Position-independent, overlay, relocatable, global, shareable, readable, writeable |
| FARFL | 4 bytes | Position-independent, overlay, relocatable, global, shareable, readable, writeable |
| RPTFL | 4 bytes | Position-independent, overlay, relocatable, global, shareable, readable, writeable |
| FDNO | 4 bytes | Position-independent, overlay, relocatable, global, shareable, readable, writeable |
| SDNO | 4 bytes | Position-independent, overlay, relocatable, global, shareable, readable, writeable |
| FARR | 81 bytes | Position-independent, overlay, relocatable, global, shareable, readable, writeable |
| RPTR | 81 bytes | Position-independent, overlay, relocatable, global, shareable, readable, writeable |
| TXT | 201 bytes | Position-independent, overlay, relocatable, global, shareable, readable, writeable |
| PAR | 12 bytes | Position-independent, overlay, relocatable, global, shareable, readable, writeable |
| RPT | 100 bytes | Position-independent, overlay, relocatable, global, shareable, readable, writeable |
| SRPT | 100 bytes | Position-independent, overlay, relocatable, global, shareable, readable, writeable |
| SEXMAP | 5 bytes | Position-independent, overlay, relocatable, global, shareable, readable, writeable |
| MOVEMAP | 3 bytes | Position-independent, overlay, relocatable, global, shareable, readable, writeable |
| RPTFM1 | 21 bytes | Position-independent, overlay, relocatable, global, shareable, readable, writeable |
| RPTFM2 | 51 bytes | Position-independent, overlay, relocatable, global, shareable, readable, writeable |
| FARFMT | 9 bytes | Position-independent, overlay, relocatable, global, shareable, readable, writeable |
| $CHAR_STRING_CONSTANTS | 1463 bytes | Position-independent, relocatable, readable, writeable |

Function Definition Map
-----------------------

| Line | Name |
|---|---|
| 339 | main |
| 483 | getprim |
| 559 | getother |
| 591 | locate |
| 621 | init_all |
| 632 | close_all |
| 644 | kabort |

It is claimed:

1. A computer based system for aiding in a determination of which one of a large number of a predetermined list of payment categories is most appropriate for reimbursement of a provider of medical services to a patient, each of said categories being dependent upon several factors including a principal diagnosis of the patient's problem, the procedure(s) performed upon the patient, the age of the patient, and the presence or absence of any complications or co-morbidity, said system comprising:

means responsive to information of a patient for providing an attending physician soon after medical services to the patient have commenced with a listing of a plurality of payment categories that are medically related to an intial category that is determined to be correct when medical services are commenced, whereby the physician may quickly identify any such reimbursement related category that is more closely suited to the patient than the initial category, and means responsive to an identification by the physician of one of said related categories as more closely suited to the patient than the initial category for providing the physician with a new listing of a plurality of payment categories that are medically related to the new identified category, whereby the physician has another opportunity to identify yet another reimbursement related category that is more closely suited to the patient than the identified category, thereby aiding in an accurate payment category determination being made by the attending physician by the time medical services to the patient have ended.

2. The system according to claim 1 which additionally comprises means responsive to individual diagnosis and procedure codes determined from patient records after medical services to the patient have ended for generating therefrom a payment category and comparing that category with that determined by the attending physician, whereby an identity of categories determined by the different methods indicates an accurate single category determination and a difference between them can be the cause for a reconcillation to be made.

3. A computer system for assisting in the selection of which of a plurality of predetermined payment categories applies for medical services provided to each of a plurality of patients, comprising:

means for storing an identifying number, textual description and characteristics of each of said plurality of said predetermined payment categories, and identifying numbers of other medically related of said payment categories, means responsive to a computer input device for receiving information of each patient, means responsive to the payment category storage means and to the patient information receiving means for assembling a listing of a working payment category, its text and the identifying numbers and textual descriptions for each of the categories medically related to said working category, and said patient informtion receiving means additionally comprising means including a storage medium of patient information for changing the working category in response to said input device and in a manner that said assembling means is able to reassemble a listing of the related categories for the new working category, whereby a few categories that are possible alternatives to the working category for each of the patients are listed along with the working category, from which medical personnel may select an updated new working category and obtain a new listing of categories related to the new working category.

4. The computer system according to claim 3 which additionally comprises means responsive to the patient information receiving means and the payment category storage means for noting on said listing whether the existance of other factors would alter the working category, whereby medical personnel are altered to note the existance of any such factor.

5. The computer system according to claim 3 wherein said listing assembly means includes means for printing said listing on a single page of paper.

6. A computer system for assisting in a selection of which of a plurality of predetermined payment categories applies for medical services provided to each of a plurality of patients, comprising:

means for storing an identifying number, textual description and characteristics of each of said plurality of predetermined payment categories, such characteristics including an operative patient age range, operative patient sex, whether either a complication or co-morbidity is required for the category, and a plurality of identifying numbers of medically related categories, means responsive to a computer input device for receiving and storing information of each patient, including the patient's age, sex and a working payment category determination, means responsive to the payment category storage means and to the patient information storage means for assembling a listing for each patient of the working payment category, its text and identifying numbers and textual descriptions for each of the categories related to said working category, said assembling means including means responsive to the patient storage means for eliminating those related categories that cannot exist for any of the sex, age or complications or co-morbidity of the patient, and said patient information storage means additionally including means for changing the working category in response to said input device and in a manner that said assembling means is able to reassemble a listing of related categories for the new working category, whereby a few categories that are possible alternatives to the working category for a particular patient are listed along with the working category, thereby making it possible for medical personnel to easily and continuously update the working category for an existing patient.

7. The computer system according to claim 6 which additionally comprises means responsive to the patient information storage means and the payment category storage means for noting on said listing whether the existance of a complication or co-morbidity would alter the working category, whereby medical personnel are alerted to note the existance of any complication or co-morbidity.

8. The computer system according to claim 6 wherein said listing assembling means includes means for printing said listing on a single page of paper.

9. The computer system according to claim 6 wherein said listing assembling means includes means responsive to the characteristics of the working payment category of said payment category storage means for including an indication in the listing as to whether the existance of a complication or comorbidity could change the working payment category to another category, whereby medical personnel are alerted as to the effect of this payment relevant factor.

10. A computer system for assisting in the selection of which of a plurality of payment categories applies for medical services provided to each of a plurality of patients, comprising:

means for storing an identifying number, textual description and characteristics of each of said plurality of payment categories, including the effect of a complication or comorbidity (C.C.), such characteristics comprising:

an operative patient age range, operative patient sex, a plurality of identifying numbers of medically related payment categories, C.C. Move, having a first state if a C.C could make no difference in payment category assignment and a second state if a C.C. could cause selection of a different payment category, and C.C. Age, being that age range where an existence of a C.C. makes a difference in the applicability of this payment category, means responsive to a computer input device for receiving and storing information of each patient, including the patient's age, sex and a working payment category determination, means responsive to the payment category storage means and to the patient information storage means for assembling a listing for each patient of the working payment category, its text and identifying numbers and textual descriptions for at least some of the related categories, means responsive to the payment category storage means and to the patient information storage means for including in said listing a first message if said C.C. Move of the working payment category is in its said first state and the age of the patient is within the C.C. Age, means responsive to the payment category storage means and to the patient information storage means for including in said listing a second message if said C.C. Move of the working payment category is in its said second state and the age of the patient is within the C.C. Age, and means responsive to the payment category storage means and to the patient information storage means for omitting both of said first and second messages when the age of the patient is not within the C.C. Age.

* * * * *

UNITED STATES PATENT AND TRADEMARK OFFICE
CERTIFICATE OF CORRECTION

PATENT NO. : 4,667,292

DATED : May 19, 1987

INVENTOR(S) : Mohlenbrock et al.

It is certified that error appears in the above-identified patent and that said Letters Patent is hereby corrected as shown below:

Col. 35, line 27: "intial" should be --initial--;
        line 56: "reconcillation" should be --reconciliation--;

Col. 36, line 14: delete "the" before "identifying";
        line 17: "informtion" should be --information--;
        lines 35, 37: "existance" should be --existence--;
        line 36: "altered" should be --alerted--;
        line 39: "assembly" should be -assembling--;

Col. 37, lines 16, 18, 27: "existance" should be --existence--;
        lines 28, 39: "comorbidity" should be --co-morbidity--.

Signed and Sealed this

First Day of September, 1987

*Attest:*

DONALD J. QUIGG

*Attesting Officer*       *Commissioner of Patents and Trademarks*